(12) United States Patent
Degodoi (10) Patent No.: US 10,485,303 B2
(45) Date of Patent: Nov. 26, 2019

(54) BICYCLE SHOE BASE AND CLEAT POSITIONING DEVICES, SYSTEMS, AND METHODS FOR USE

(71) Applicant: Josef Kevin Lucero Degodoi, Kirkland, WA (US)

(72) Inventor: Josef Kevin Lucero Degodoi, Kirkland, WA (US)

(*) Notice: Subject to any disclaimer, the term of this patent is extended or adjusted under 35 U.S.C. 154(b) by 0 days.

(21) Appl. No.: 16/122,429

(22) Filed: Sep. 5, 2018

(65) Prior Publication Data
US 2019/0000190 A1    Jan. 3, 2019

Related U.S. Application Data

(63) Continuation of application No. PCT/US2018/020208, filed on Feb. 28, 2018.

(60) Provisional application No. 62/600,810, filed on Mar. 6, 2017, provisional application No. 62/600,848, filed on Mar. 6, 2017, provisional application No. 62/600,828, filed on Mar. 6, 2017.

(51) Int. Cl.
| | |
|---|---|
| *A43D 5/02* | (2006.01) |
| *A43D 1/08* | (2006.01) |
| *A43B 5/14* | (2006.01) |
| *A43C 15/16* | (2006.01) |
| *B62M 3/08* | (2006.01) |

(52) U.S. Cl.
CPC .............. *A43D 5/02* (2013.01); *A43B 5/14* (2013.01); *A43C 15/16* (2013.01); *A43D 1/08* (2013.01); *B62M 3/086* (2013.01)

(58) Field of Classification Search
CPC .. A43D 5/02; A43D 5/14; A43D 1/08; B62M 3/086; A43C 15/16; A43B 5/14
USPC .. 12/124, 126, 123.3, 133 R, 313, 315, 123, 12/123.5; 36/132, 134
See application file for complete search history.

(56) References Cited

U.S. PATENT DOCUMENTS

| | | | | |
|---|---|---|---|---|
| 2010/0024590 | A1* | 2/2010 | O'Neill | G01L 3/242 74/594.1 |
| 2011/0277250 | A1* | 11/2011 | Langvin | A43B 3/0084 12/133 R |

(Continued)

FOREIGN PATENT DOCUMENTS

WO    WO 2005/025974 A1    3/2005

OTHER PUBLICATIONS

International Search Report and Written Opinion in connection with corresponding International Patent Application No. PCT/US2018/020208 dated May 16, 2018.

*Primary Examiner* — Nathan E Durham
*Assistant Examiner* — Abby M Spatz
(74) *Attorney, Agent, or Firm* — Knobbe, Martens, Olson & Bear, LLP (57) ABSTRACT

A bicycle shoe cleat positioning device for use in determining the position of a bicycle shoe cleat is provided. The bicycle shoe cleat positioning device comprises a base portion, a holding portion connected to the base portion, a coupler configured to connect to the holding portion, a cleat connector, a connecting member, and a cleat positioning assembly. The cleat positioning assembly comprises a first positioner configured to determine a first position of the cleat connector about a first axis, a second positioner configured to determine a second position of the cleat connector along a second axis, and a third positioner configured to determine a third position of the cleat connector along a third axis.

20 Claims, 5 Drawing Sheets

(56) References Cited

U.S. PATENT DOCUMENTS

| | | |
|---|---|---|
| 2013/0318805 A1 | 12/2013 | Aoki et al. |
| 2013/0333124 A1* | 12/2013 | Okamoto ................. A43B 5/14 12/123 |
| 2014/0317956 A1 | 10/2014 | Tanaka |
| 2015/0177083 A1 | 6/2015 | Redmond |
| 2016/0309847 A1 | 10/2016 | Le Goallec |

* cited by examiner

BICYCLE SHOE BASE AND CLEAT POSITIONING DEVICES, SYSTEMS, AND METHODS FOR USE

BACKGROUND

Bicycle shoes intended for road bicycling typically include a base and a removable, repositionable bicycle cleat on the base of each bicycle shoe. A rider's cycling power is transferred from the rider's foot, through the base of the bicycle shoe, through the bicycle cleat and to the bicycle pedal to drive the bicycle pedal and the associated bicycle crank. The bicycle pedal transfers the rider's cycling power through the bicycle crank to the bicycle drivetrain. Accordingly, the bicycle shoe base, the bicycle cleat, and the bicycle pedal are each important to the transmission of power to the bicycle drivetrain.

Various styles of pedals are available to accommodate different types of bicycles and different types of bicycling. For instance, clipless pedals (e.g., step-in pedals) are frequently used with bicycles designed for longer and/or more efficient riding, such as road bicycles. The clipless bicycle pedals releasably connect with bicycle cleats mounted to the base of each bicycle shoe. When the bicycle shoe bases are connected to the bicycle pedals via the bicycle cleats, the rider's feet are locked into positions relative to the pedals. In this way, bicycle cleat position relative to the bicycle shoe base dictates the position of the bicycle shoe on the pedal, and by extension, the rider's knee position relative to the pedals. Proper knee position is imperative, as cycling with improper knee position causes sub-optimal performance, stress, and/or temporary or permanent damage to the surrounding muscles, ligaments, and related anatomical structures in the rider's knees.

Traditional methods exist for mounting a bicycle cleat in a specific position on a bicycle shoe base. These methods are employed when bicycle cleats wear or break with use, or when the bicycle cleats or shoes are otherwise replaced or upgraded. Each replacement of the cleats requires the cleats to be adjusted relative to the bicycle shoe base to achieve the proper cleat position for the rider. The first step in the traditional method of mounting a bicycle cleat to a desired position along the shoe base is to outline the existing cleat's position (e.g., using a pen, tape, or similar marking implement) on the bicycle shoe base. The second step in this traditional method is to manually attempt to mount the bicycle cleat on the shoe base within the outline of the cleat being replaced. Obtaining the proper cleat position is even more difficult when bicycle shoes are replaced, as there is no prior cleat position on the shoe base to outline. Accordingly, before new bicycle shoes can safely be used, the rider must engage in an iterative process of cleat repositioning and testing until an acceptable, not necessarily proper, cleat position is finally obtained.

Prior methods for positioning a bicycle cleat on a bicycle shoe base typically involve the use of an existing bicycle cleat positioning device. Existing bicycle cleat positioning devices are meant to assist with positioning the new bicycle cleat relative to a reference point of the shoe base. Such devices typically include a support structure and a cleat adjusting portion. In use, a heel portion of the bicycle shoe base rests atop the support structure. The new cleat is associated with the cleat engaging portion, which is used to adjust the position of the bicycle cleat relative to a reference point on the shoe base.

Traditional bicycle shoe bases and cleat positioning devices are inadequate for several reasons. For example, existing shoe bases and cleat positioning devices fail to adequately secure the heel portion of the shoe base to the bicycle cleat positioning device. The lack of a secure connection between existing shoe bases and cleat positioning devices allows the shoe base to move or become misaligned relative to the cleat. The relative movement or misalignment allowed by these existing shoe bases and positioning devices results in inaccurate cleat placement and cleat misalignment when a user uses the device to position a cleat or adjust cleat position relative to the reference orientation. Additionally, prior cleat positioning devices do not hold the cleat in place relative to the shoe base, but instead allow the cleat to merely rest against the shoe base as its position is adjusted. The failure to secure the cleat to the cleat positioning device allows the cleat to move relative to the shoe base, thereby causing additional inaccuracy in cleat placement or measurement. Further, existing cleat positioning devices are typically only configured to interface with one manufacturer's shoe base and/or one style of cleat.

Existing bicycling cleat positioning techniques are also inadequate for several reasons. The traditional tracing method of cleat replacement is inaccurate because it relies on the operator's ability to perfectly outline the existing cleat's position and then position the new cleat within the traced area on the bicycle shoe base. Replacement cleats may come from a different manufacturer or have a slightly different configuration from the existing cleat, such that the replacement cleat cannot be accurately positioned with the traced area of the existing cleat. Further, shoe replacement requires an iterative process of cleat positioning, rider testing, and repositioning that is inefficient, wastes resources, and does not precisely or reliably allow the rider to reproduce the cleat position from the old bicycle shoes on the new bicycle shoes. In addition, such cleat positioning methods are inaccurate because each requires the operator's judgment to be exercised when attempting to replace the new cleat in the prior cleat's position. Therefore, the outcome of these conventional cleat positioning techniques is dependent on the patience and skill of the operator, thereby leading to inconsistent cleat positioning outcomes.

Accordingly, there is a need for an improved bicycle shoe base and cleat positioning system that enables more accurate measuring, positioning, and securing of a cleat to a bicycle show while being interoperable with any manufacturer's shoe base configuration or cleat style.

SUMMARY OF THE INVENTION

The systems, methods and devices described herein have innovative aspects, no single one of which is indispensable or solely responsible for their desirable attributes. Without limiting the scope of the claims, some of the advantageous features will now be summarized.

In accordance with at least one of the embodiments disclosed herein, a bicycle shoe cleat positioning device for use in determining the position of a bicycle shoe cleat is provided. The bicycle shoe cleat positioning device comprises a base portion having a top base surface; a holding portion having a top part and a bottom part, the bottom part being fixedly connected to the base portion; a coupler configured to connect to the top part of the holding portion when in use; a cleat connector having a top side and a bottom side; a connecting member; and a cleat positioning assembly for determining the position of a bicycle shoe cleat. The top side of the cleat connector is configured to accommodate and secure to a bicycle shoe cleat when in use. The bottom side of the cleat connector is connected to the connecting member. The cleat positioning assembly comprises a first positioner configured to determine a first position of the cleat connector about a first axis; a second positioner configured to determine a second position of the cleat connector along a second axis; and a third positioner configured to determine a third position of the cleat connector along a third axis. The first positioner has a top portion and a bottom portion, and the top portion is connected to the connecting member. The second positioner has a top portion and a bottom portion, and the top portion is movably engaged with the first positioner such that the first positioner can only move relative to the first axis. The third positioner has a top portion and a bottom portion, the top portion being movably engaged with the second positioner such that the second positioner can only move relative to the second axis, and the bottom portion being movably engaged with the top base surface such that the third positioner can only move relative to the third axis.

According to a further aspect, the first, second, and third positioners are selectively and separately securable to prevent and permit movement of the positioners relative to the respective axes.

According to a further aspect, the first, second, and third axes are perpendicular to one another.

According to a further aspect, the first axis is a rotational axis defined perpendicular to the second and third axes such that the first position is an angular rotation defined about the first axis.

According to a further aspect, the second axis is a linear axis such that the second position is a linear position defined along the second axis.

According to a further aspect, the third axis is a linear axis such that the third position is a linear position defined along the third axis.

According to a further aspect, the positions of the positioners define a set of coordinates, and the set of coordinates reflects the position of a bicycle shoe cleat relative to a reference point on a heel portion of a bicycle shoe when the shoe is secured to the device.

According to a further aspect, the holding portion and the coupler connect with a snap-fit connection.

According to a further aspect, the coupler is integral with an outsole of a bicycle shoe.

According to a further aspect, the coupler is integral with a coupler adapter that is connected to an outsole of a bicycle shoe.

According to a further aspect, the first positioner further comprises a first scale along an outer periphery which corresponds to the first position of the cleat connector, and thereby a first position of the cleat when in use, relative to the first axis.

According to a further aspect, the second positioner further comprises a second scale along an outer periphery which corresponds to the second position of the cleat connector, and thereby a second position of the cleat when in use, relative to the second axis.

According to a further aspect, the third positioner further comprises a third scale along an outer periphery which corresponds to the third position of the cleat connector, and thereby a third position of the cleat when in use, relative to the third axis.

According to a further aspect, the first positioner further comprises a first annular shape, the second positioner further comprises a second annular shape, and the third positioner further comprises a third annular shape.

According to a further aspect, the cleat connector is removably connected to the cleat positioning assembly such that the cleat connector is interchangeable for accommodating and securing a variety of bicycle shoe cleat types.

In accordance with at least one of the embodiments disclosed herein, a shoe base and cleat positioning system for use in determining the position of and adjusting a cleat is provided. The shoe base and cleat positioning system comprises a shoe base; and a cleat positioning device. The shoe base has a heel portion and a toe portion, a coupler extending downwardly from the heel portion. The cleat positioning device comprises a base portion having a top surface; a holding portion secured to the base portion, the holding portion comprising a coupling portion at a top end for removably securing to the coupler of the shoe base in use; a cleat connector having a working side configured to accommodate and couple with a cleat when in use and a positioner side operatively connecting to a connecting member; and a cleat positioning assembly for determining the position of the cleat when in use. The cleat positioning assembly comprises a first positioner configured to determine a first position of the cleat connector about a first axis; a second positioner configured to determine a second position of the cleat connector along a second axis; and a third positioner configured to determine a third position of the cleat connector along a third axis. The first positioner has a top portion and a bottom portion, and the top portion is connected to the connecting member. The second positioner has a top portion and a bottom portion, and the top portion is movably engaged with the first positioner such that the first positioner can only move relative to the first axis. The third positioner has a top portion and a bottom portion, the top portion being movably engaged with the second positioner such that the second positioner can only move relative to the second axis, and the bottom portion being movably engaged with the top base surface such that the third positioner can only move relative to the third axis.

According to a further aspect, the first, second, and third positioners are selectively securable to thereby selectively prevent and permit movement of the positioners along the respective axes.

According to a further aspect, the shoe base and cleat positioning system further comprises a technology measuring pedal. The technology measuring pedal comprises a housing. The housing comprises an electronics array. The electronics array including a plurality of sensors configured to determine an optimal cleat position of the cleat along the shoe base of the system.

According to a further aspect, the technology measuring pedal is configured to wirelessly communicate the optimal cleat position to a mobile application running in an operating environment of a mobile device.

According to a further aspect, the technology measuring pedal is configured to communicate the optimal cleat position to the shoe base.

According to a further aspect, the shoe base further comprises a storage medium configured to store the optimal cleat position communicated by the technology measuring pedal.

According to a further aspect, the cleat positioning device further comprises one or more electric actuators configured to automatically adjust the first positioner, the second positioner, and third positioner to the optimal cleat position upon communication of the optimal cleat position from the shoe base to the cleat positioning device.

In accordance with at least one of the embodiments disclosed herein, a bicycle shoe cleat positioning system for use in measuring and adjusting the position of a bicycle shoe cleat is provided. The bicycle shoe cleat positioning system comprises a bicycle shoe having an outsole that comprises a cleat portion and a heel portion, and a bicycle shoe cleat attached to the cleat portion; a base portion having a top base surface; a holding portion having a top part and a bottom part, the bottom part being fixedly connected to the base portion; a coupler configured to connect to the top part of the holding portion when in use; a cleat connector having a top side and a bottom side, the top side configured to accommodate and secure to a bicycle shoe cleat when in use, the bottom side connected to a connecting member; and a cleat positioning assembly for determining the position of a bicycle shoe cleat. The cleat positioning assembly comprises a first positioner configured to determine a first position of the cleat connector about a first axis; a second positioner configured to determine a second position of the cleat connector along a second axis; and a third positioner configured to determine a third position of the cleat connector along a third axis. The first positioner has a top portion and a bottom portion, and the top portion is connected to the connecting member. The second positioner has a top portion and a bottom portion, and the top portion is movably engaged with the first positioner such that the first positioner can only move relative to the first axis. The third positioner has a top portion and a bottom portion, the top portion being movably engaged with the second positioner such that the second positioner can only move relative to the second axis, and the bottom portion being movably engaged with the top base surface such that the third positioner can only move relative to the third axis. The first axis is a rotational axis defined perpendicular to the second and third axes. The positions of the positioners define a set of coordinates that reflects the position of the bicycle shoe cleat relative to a reference point on a heel portion of the bicycle shoe when the bicycle shoe cleat is secured to the cleat connector.

In accordance with at least one of the embodiments disclosed herein, a method of determining the position of a bicycle cleat is provided. The method comprises providing a bicycle shoe cleat positioning device. The bicycle shoe cleat positioning device comprises a first positioner configured to determine a first position of a cleat connector about a first axis; a second positioner configured to determine a second position of the cleat connector along a second axis; and a third positioner configured to determine a third position of the cleat connector along a third axis. The first positioner has a top portion and a bottom portion, and the top portion is connected to a connecting member. The second positioner has a top portion and a bottom portion, and the top portion is movably engaged with the first positioner such that the first positioner can only move relative to the first axis. The axes are perpendicular to one another, the third positioner has a top portion and a bottom portion, the top portion is movably engaged with the second positioner such that the second positioner can only move relative to the second axis, and the bottom portion is movably engaged with a base portion such that the third positioner can only move relative to the third axis. The method further comprises providing a bicycle shoe having a cleat attached to a cleat portion of an outsole of the bicycle shoe; connecting the cleat to the cleat connector; adjusting the position of the third positioner to correspond to the third position and fastening the third positioner in place; adjusting the position of the second positioner to correspond to the second position and fastening the second positioner in place; adjusting the position of the first positioner to correspond to the first position and fastening the first positioner in place, the adjusted positions of the positioners defining a set of coordinates that reflect the position of the cleat; and comparing the set of coordinates to a reference point, thereby determining the position of the cleat relative to the reference point.

In accordance with at least one of the embodiments disclosed herein, a method of adjusting the position of a bicycle shoe cleat is provided. The method comprises providing a bicycle shoe cleat positioning device. The bicycle shoe cleat positioning device comprises a holding portion connected to a base portion and having a top part; a cleat connector configured to accommodate and secure to a bicycle shoe cleat when in use, the cleat connector being connected to a connecting member; and a cleat positioning assembly. The cleat positioning assembly comprises a first positioner configured to determine the position of the cleat connector relative to a first axis, a second positioner configured to determine the position of the cleat connector relative to a second axis, and a third positioner configured to determine the position of the cleat connector relative to a third axis. The first positioner is movably engaged with the second positioner and can only move relative to the first axis, the second positioner is movably engaged with the third positioner and can only move relative to the second axis, and the third positioner is movably engaged with the base portion and can only move relative to the third axis. The method further comprises providing a bicycle shoe cleat; connecting the bicycle shoe cleat to the cleat connector; providing a bicycle shoe, the bicycle shoe including a coupler configured to connect to the top part of the holding portion; connecting the coupler to the holding portion; adjusting the positioners to a known starting position consisting of positions about the first axis and along the second and third axes, thereby moving the cleat to the known starting position; adjusting one or more of the positioners to a different location; recording the final cleat position of the positioners relative to a reference point on the bicycle shoe, thereby enabling subsequent attachment of the bicycle shoe cleat to the bicycle shoe at the recorded final cleat position.

DETAILED DESCRIPTION

Figure 1:
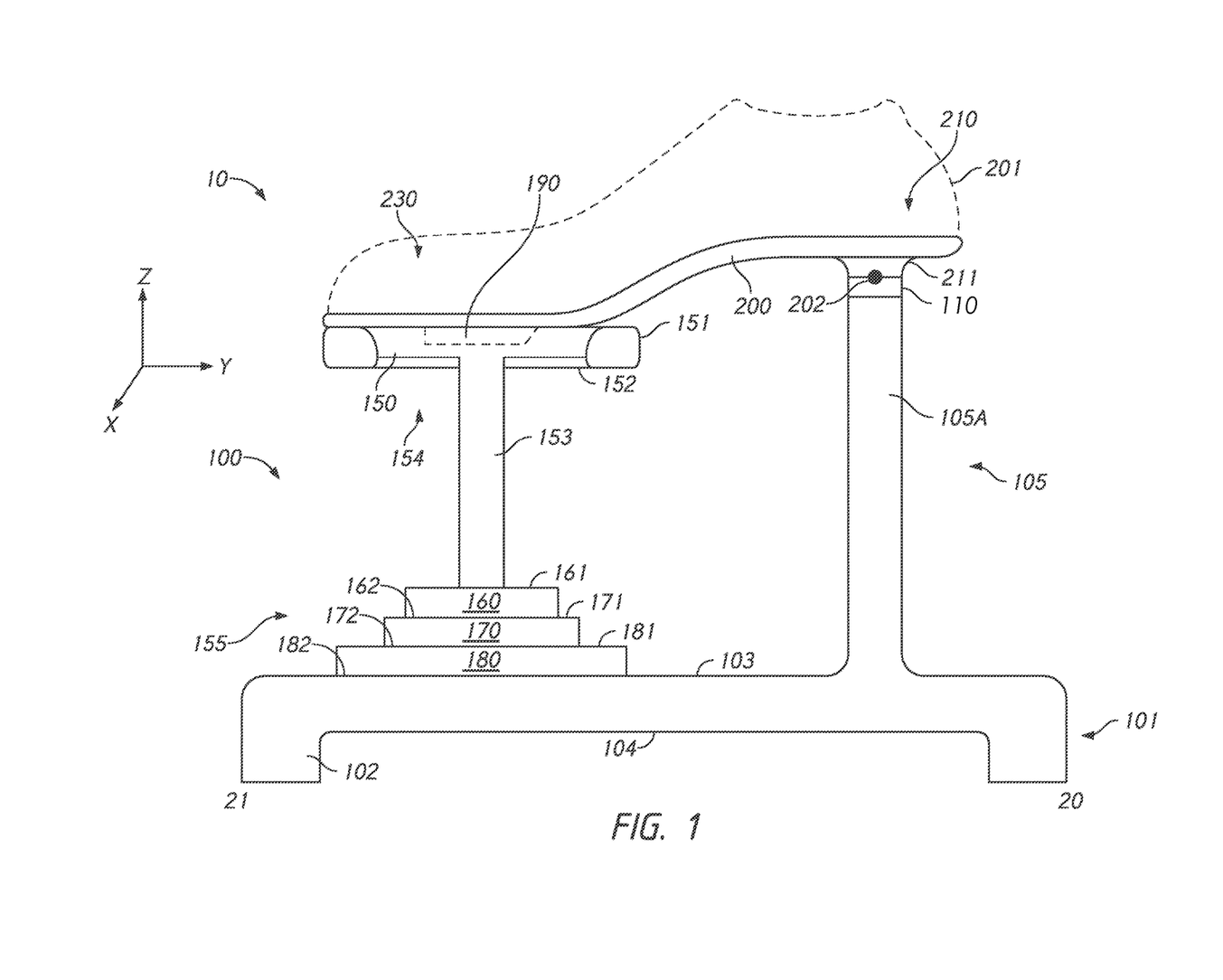
FIG. 1 is a profile view of the left side of a bicycle shoe base and cleat positioning system.
Figure 2:
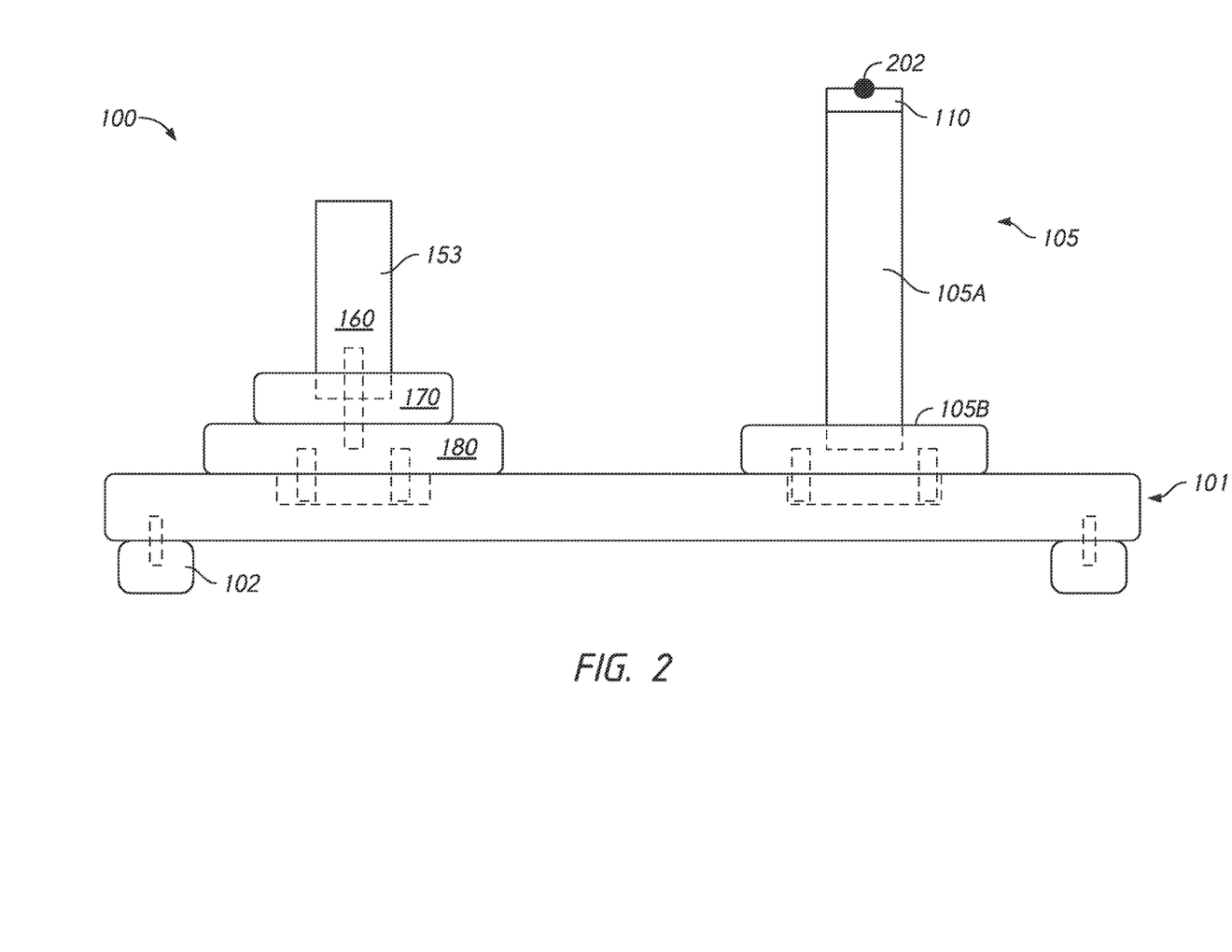
FIG. 2 is a profile view of the left side of a bicycle cleat positioning device of the bicycle shoe base and cleat positioning system of FIG. 1.
Figure 3:
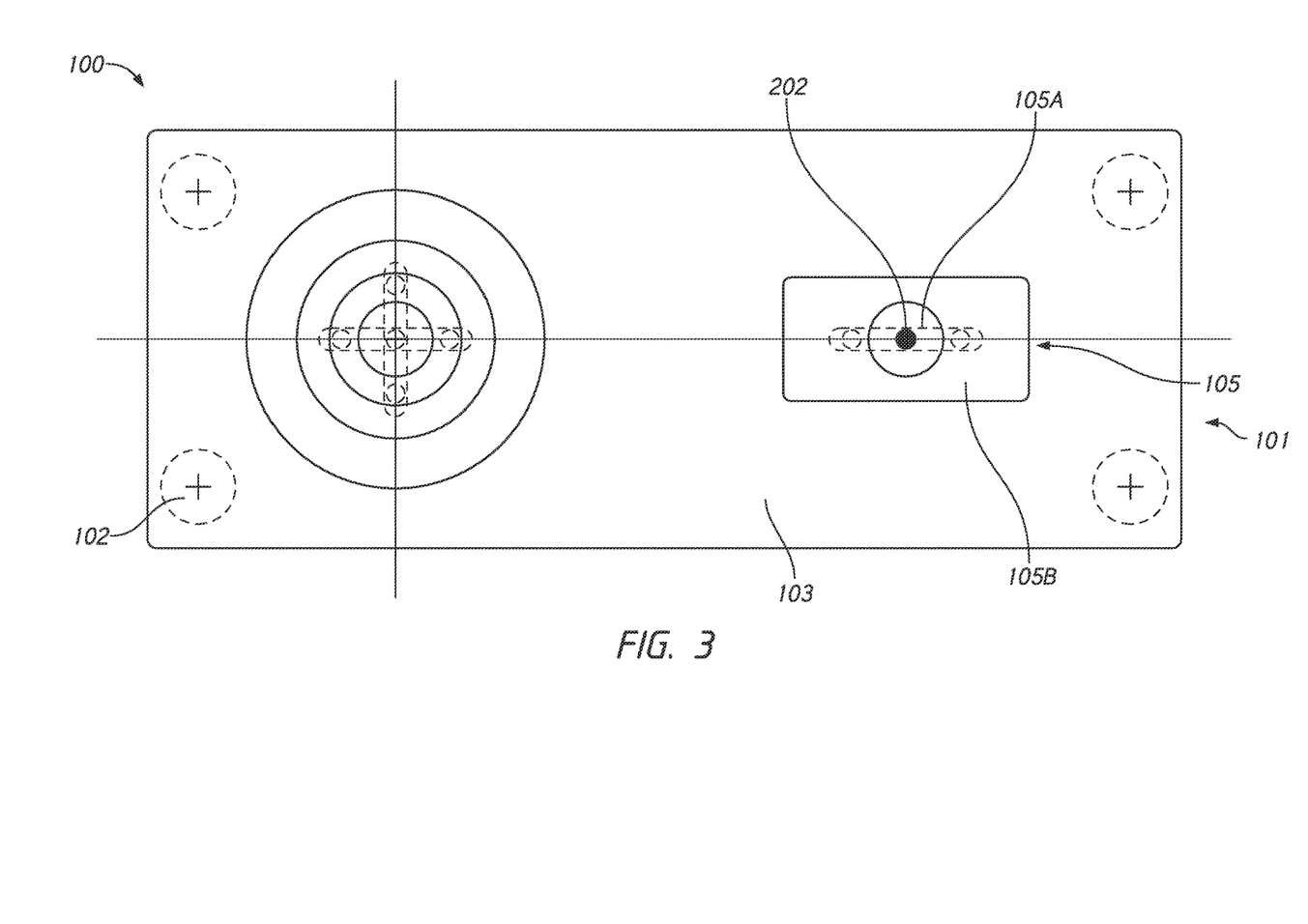
FIG. 3 is a plan view of the bicycle shoe cleat positioning device of FIG. 2.
Figure 4:
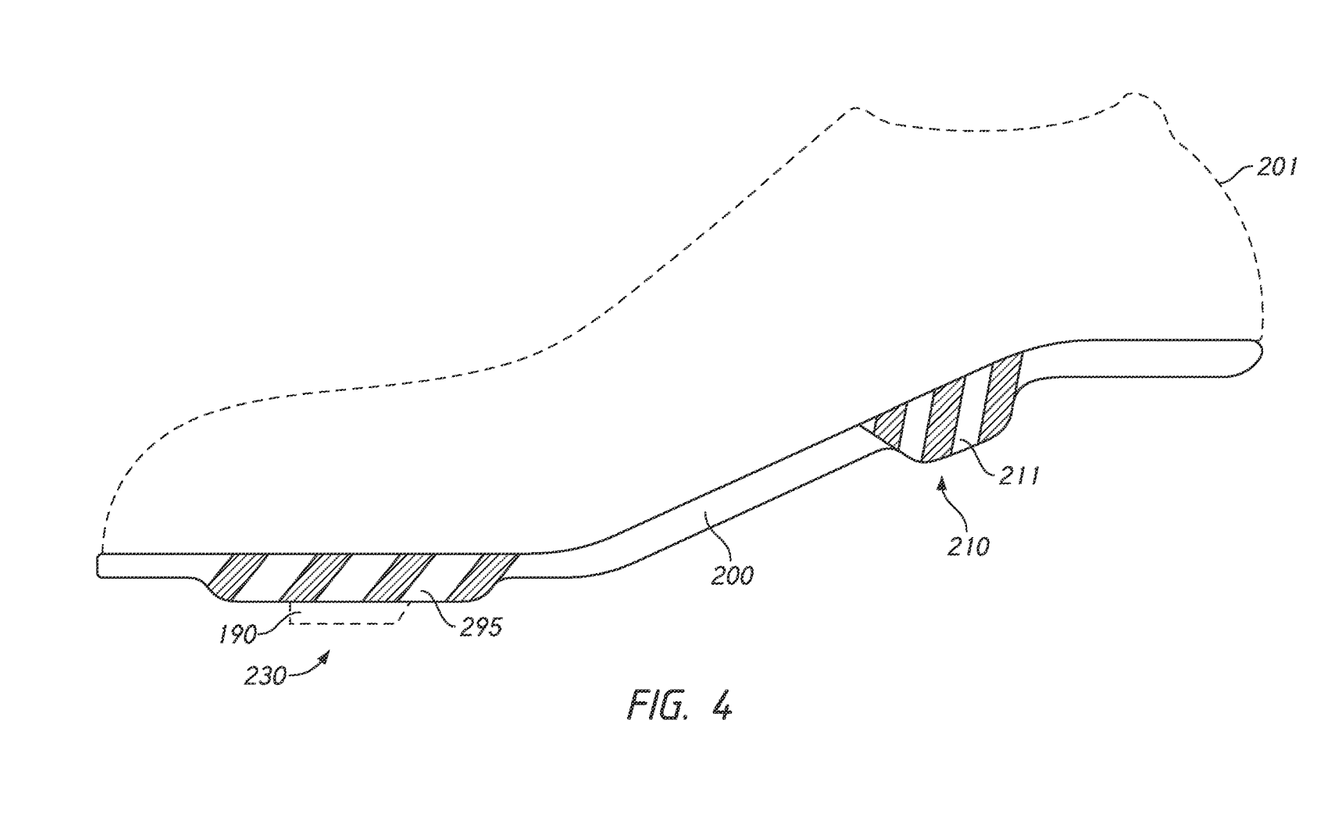
FIG. 4 is a profile view of the left side of a bicycle shoe base configured for use with the bicycle cleat positioning device of FIGS. 2-3.
Figure 5:
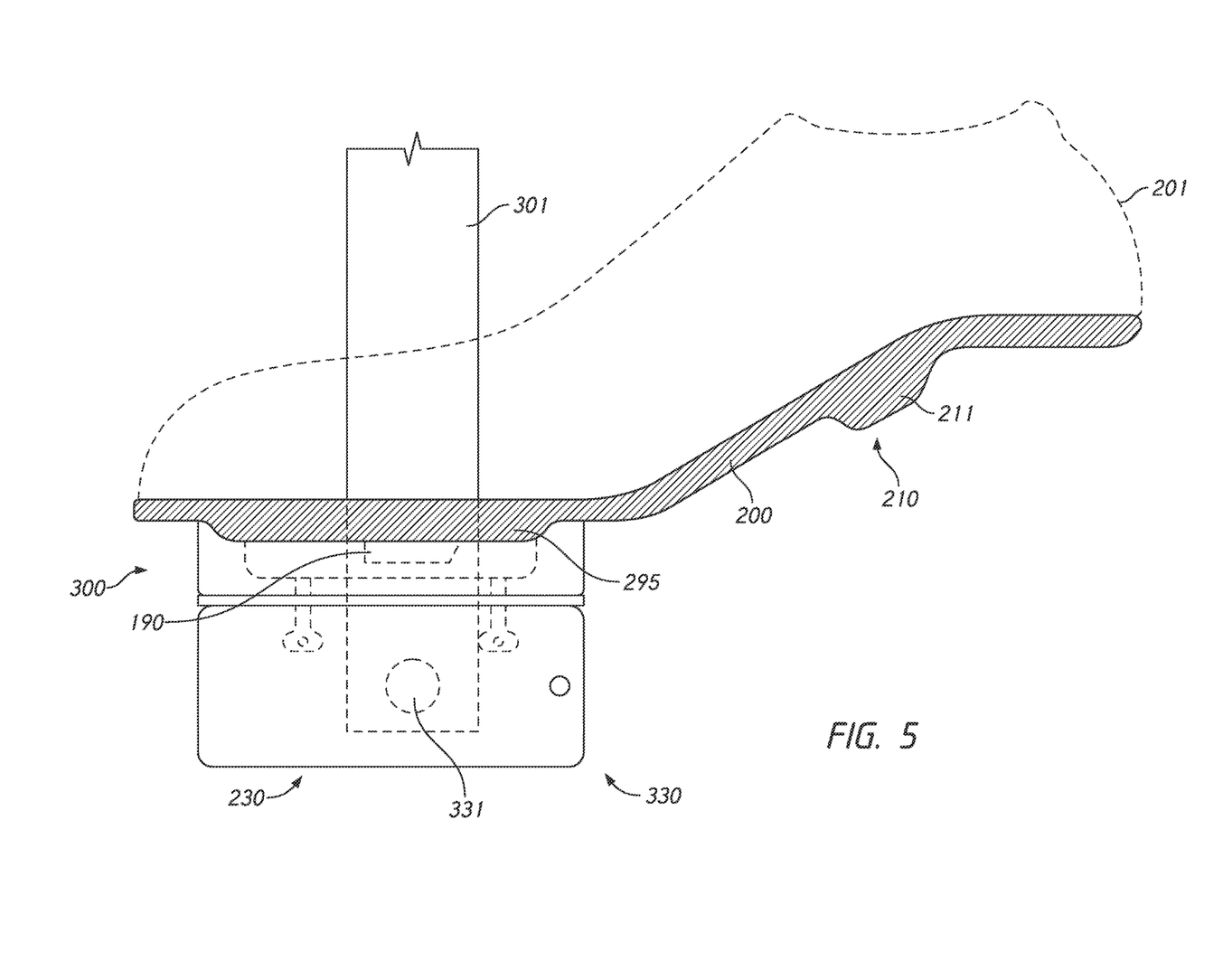
FIG. 5 is a profile view of the left side of a technology measuring pedal configured for use with the bicycle shoe base of FIG. 4.

FIGS. 1-5 depict an embodiment of a bicycle shoe base and cleat positioning system 10. FIG. 1 illustrates a bicycle shoe base and cleat positioning system 10 that comprises a bicycle cleat positioning device 100 and a bicycle shoe base 200. The bicycle shoe base 200 may removably interface with the cleat positioning device 100 in order to accurately and precisely position a new cleat 190 on the shoe base 200, reposition an existing cleat 190, or determine the exact position of an existing cleat 190. FIGS. 2-4 provide additional views of the bicycle shoe base and cleat positioning system or aspects thereof. FIG. 5 depicts a technology measuring pedal 300 that optionally may be included in the bicycle shoe base and cleat positioning system 10. The optional technology measuring pedal 300 incorporates an electronics array 330 to determine an optimal position of the cleat 190 along the shoe base 200. By securing the shoe base 200 to the cleat positioning device 100, the optimal cleat position determined when using the technology measuring pedal 300 may be readily achieved.

Cleat Positioning Device and Shoe Base

FIGS. 1-4 depict views of the bicycle shoe base and cleat positioning system 10, which comprises the cleat positioning device 100 and shoe base 200. The cleat positioning device 100 comprises a base portion 101 having a top surface 103 and a bottom surface 104 for stably resting upon a work bench or similar flat surface. FIGS. 1-3 illustrate that the base portion 101 may have one or more legs 102 or may comprise no legs such that the bottom surface 104 of the base portion contacts the work bench or other working surface in use. The one or more legs may be formed of or include a polymeric or other resilient material to allow the base portion 101 to grip the working surface and avoid movement relative to the working surface when in use.

With reference now to FIG. 1, the top surface 103 of the base portion 101 engages a holding portion 105. The holding portion 105 includes a heel support 105A that extends upwardly relative to the base portion 101 in order to support the shoe base 200 when in use. The holding portion 105 may be directly connected to the top surface 103 of the base portion 101, as shown in FIG. 1. Optionally, a base insert 105B may be secured between the base of the heel support 105A and the top surface 103 of the base portion 101. Ultimately, the holding portion 105 assists in defining a reference point from which the cleat position is measured. Accordingly, the holding portion 105 forms a sufficiently rigid connection with the base portion 101 that the heel support 105A does not substantially deflect or move relative to the base portion 101. The base portion 101 and holding portion 105 are thus formed of a metal, metal alloy, wood, or polymeric material with sufficient rigidity to prevent the relative movement of the holding portion 105 with the base portion 101.

The holding portion 105 terminates at its top end with a coupling portion 110. As illustrated in FIG. 1, the coupling portion 110 is configured to removably secure to a coupler 211. In some configurations, the coupling portion 110 removably secures to the coupler 211 at the heel portion 210 of the shoe base 200 when the cleat positioning device 100 is in use. In other configurations, when in use, the coupling portion 110 removably secures to the coupler 211 at another portion of the shoe base 200, such as a center portion of the shoe base 200. For example, the coupling portion 110 of the holding portion 105 may comprise the male end of a snap-fit connection with the coupler 211. The coupler 211 may be located along the shoe base 200 and comprise the female portion of the snap-fit connection formed with the coupling portion 110. Accordingly, the coupling portion 110 may comprise one or more projections that extend upward to engage the coupler 211 when the cleat positioning device 100 is in use. Similarly, the coupler 211 may comprise one or more recesses capable of being engaged by the coupling portion 110 with a snap-fit. Optionally, the coupling portion 110 may removably securely engage the coupler 211 of the shoe base 200 through a mechanical interlock, friction fit, tongue-and-groove, or other suitable removable connection mechanism that is capable of maintaining the position of the shoe base 200 relative to the cleat positioning device 100. In some embodiments, the coupling portion 110 may engage one or more sides of the shoe base 200 instead of engaging a coupler 211 on the bottom of the shoe base 200.

FIG. 4 depicts the shoe base 200 that is configured to be used with the cleat positioning device 100. The shoe base 200 allows the upper portion of the shoe 201 to be removably secured to the cleat positioning device 100 via the coupler 211 along the heel portion 210 or the center portion and via the cleat 190 along a toe portion 230. The shoe base 200 may be either removably or permanently secured relative to an upper portion of the shoe 201 such as a bicycle shoe, as shown in FIG. 1. In some embodiments, the shoe base 200 may be an adapter that renders any manufacturer's shoe compatible with the cleat positioning device 100. When used as an adapter, the shoe base 200 may be removably secured to the existing sole of the shoe 201. The ability to use the shoe base 200 as an adapter to make any shoe 201 compatible with the cleat positioning device 100 allows the shoe base and cleat positioning system 10 to be a universal system that is readily compatible with all makes and models of shoes 201 and cleats 190. For example, the adapter configuration of the shoe base 200 may encompass the sole of the shoe 201 to effectively replace with sole of the shoe 201 with the shoe base 200 that is compatible with the cleat positioning device 100. Optionally, the adapter may only engage the heel of a shoe 201 and provide a coupler 211 to enable the shoe 201 to removably secure to the coupling portion 110 and thus be usable with the cleat positioning device 100. With respect to materials, the shoe base 200 may be formed of polymer or composite materials (e.g., a carbon fiber composite) which have high rigidity and durability but are very light in weight.

With reference again to FIG. 1, the heel portion 210 of the shoe base 200 includes a coupler 211 that removably secures the shoe base 200 to the coupling portion 110 of the holding portion 105. The coupler 211 may extend downwardly from the upper portion of the shoe 201 in order to removably secure to the coupling portion 110 of the cleat positioning device 100, as is also shown in FIG. 4. The coupler 211 may comprise female end of a snap-fit connection with the coupling portion 110, which may form the male end of the connection. Other suitable removable connections are possible for securing the shoe base 200 to the coupling portion 110, as described above. Through its connection with the coupling portion 110, the coupler 211 allows the shoe base 200 to be secured against movement or misalignment with respect to the cleat positioning device. The coupler 211 ensures that the shoe base 200, and by extension, the upper portion of the shoe 201, couples with the cleat positioning device 100 at an identical position and with an identical orientation each time. Accordingly, the connection of the coupler 211 with the coupling portion 110 defines a reference point 202 on the bottom of the shoe base 200. The reference point 202 may be located at the midpoint of the connection between the coupler 211 and the coupling portion 110, as shown in FIG. 1. This reference point may be indicated on the holding portion 105 or the sides of the shoe base 200. By securely coupling the coupler 211 of the shoe base 200 to the cleat positioning device 100 at the reference point 202 each time, the position of the cleat 190 may be accurately measured and/or adjusted with respect to the reference point 202 using the remaining aspects of the cleat positioning device 100.

The remaining aspects of the cleat positioning device 100 comprise the cleat connector 150 and the cleat positioning assembly 155. The cleat connector 150 is configured to removably couple to a cleat 190 provided to the shoe base 200. The cleat connector 150 has a working side 151 facing upward and a positioner side 152 facing toward the base portion 101 of the cleat positioning device. The cleat connector 150 can accommodate any style or version of a cleat, such as a bicycle cleat. Each cleat connector 150 may include a recessed portion along its working surface 151 that includes the connection features sufficient to secure to a particular type or style of cleat 190.

To be able to accommodate any cleat, the cleat connector 150 may be an interchangeable aspect of the cleat positioning device 100. The cleat connector 150 may define a substantially disc-like member that is configured to receive and couple with a given cleat 190. In some embodiments, a connecting member 153 extends downwardly from the positioner side 152 of the cleat connector 150. In the non-limiting embodiment shown in FIG. 1, the connecting member 153 is integral with the cleat connector 150. In other embodiments, the connecting member 153 may be removably connected with the cleat connector 150. Accordingly, the connecting member 153 may or may not be removed from the cleat positioning device 100 when the cleat connector 150 is swapped with another cleat connector 150 that is compatible with the cleat 190 installed to a given shoe base 200.

The cleat connector 150 and connecting member 153 are operatively connected at the lower end of the connecting member 153 to a cleat positioning assembly 155. The connecting member 153 may removably attach to the cleat positioning assembly via snap-fit, mechanical interlock, threaded engagement, friction fit, or suitable removable connection mechanism. When measuring the position of a cleat 190 (e.g., the position along the X, Y, and Z axes compared to the reference point 202), the cleat 190 of the shoe base 200 is secured to the cleat connector 150. The cleat connector 150 is then moved (e.g., translated, rotated) as is necessary until the coupler 211 aligns with and can secures to the coupling portion 110. The movement (e.g., along the X, Y, and Z axes) of the shoe base 200 that is required to allow the coupler 211 to secure with the coupling portion 110 is measured by the positioner assembly 155, as described below. Accordingly, the cleat connector 150 and connecting member 153 relay the position of the cleat 190 to the positioning assembly, or vice versa (e.g., when placing a cleat 190 on the shoe base 200), when the cleat positioning device 100 is in use.

With reference now to FIGS. 1-2, the connecting member 153 interconnects the cleat connector 150 with the positioning assembly 155. The cleat positioning assembly 155 comprises one or more cleat positioners that are configured to measure or adjust the position of the cleat 190. In the non-limiting embodiment illustrated in FIG. 1, for example, the cleat positioning assembly 155 comprises a first positioner 160, a second positioner 170, and a third positioner 180. In some configurations, only one cleat positioner 160 is present. In other embodiments, two positioners 160, 170 are included in the positioning assembly 155. In further embodiments, four or more positioners are included in the positioning assembly 155. In other embodiments, such as the embodiment of FIG. 2, the connecting member 153 may define the first positioner 160. The connecting member 153 may removably connect to any of the positioners included in the positioning assembly 155. In the embodiment illustrated in FIG. 2, the connecting member 153 defines the first positioner 160 and is removably operatively connected to the third positioner 180. The connecting member 153 may removably operatively connect to the first positioner 160, as shown in FIG. 1.

With reference again to FIG. 1, the positioners may have a generally cylindrical or annular shape and may progressively increase in width from the first positioner 160 to the third positioner 180. The first positioner 160 may have a first positioner top 161 and first positioner bottom 162. The second positioner 170 may have a second positioner top 171 and second positioner bottom 172. The third positioner 180 may have a third positioner top 181 and a third positioner bottom 182. The first positioner top 161 may removably or permanently connect to the connecting member 153. The first positioner may be rotatable relative to the second positioner 170, such that the first positioner bottom 162 may be rotatable about the Z-axis. The first positioner 160 may otherwise be restrained from movement in the X-axis and Y-axis directions relative to the second positioner 170. The second positioner 170 may be rotatably engaged with the first positioner 160, as described above. The second positioner 170 may be translatable relative to the third positioner 180, such that the second positioner bottom 172 may be translatable along the Y-axis. The second positioner 170 may otherwise be restrained from rotation about the Z-axis or movement along the X-axis relative to the first and third positioners 160, 180. The third positioner 180 may be located between the second positioner 170 and the top surface 103 of the base portion 101 of the cleat positioning device 100. The third positioner 180 may be translatable relative to the base portion 101, such that the third positioner bottom 182 may be translatable along the X-axis. The third positioner 180 may otherwise be restrained from rotation about the Z-axis or movement about the Y-axis relative to the first and second positioners, 160, 170. The first positioner 160 may allow the cleat connector 150 and connecting member 153 to rotate about the Z-axis, the second positioner 170 may allow the cleat connector 150 and connecting member 153 to translate along the Y-axis, and the third positioner 180 may allow the cleat connector 150 and connecting member 153 to translate along the X-axis. In some embodiments, the positioners may be limited to movement with respect to different axes. For example, the first positioner 160 may be limited to X-axis translation while the third positioner 180 is limited to Z-axis rotation, relative to the reference point 202. Regardless of the axis measured by each positioner, each of the positioners may indicate the position of the cleat 190 with respect to one axis only, relative to the reference point 202. Accordingly, the three positioners 160, 170, and 180 define a coordinate that comprises the X-axis translation, Y-axis translation, and Z-axis rotation of the cleat 190 along the shoe base 200 relative to the reference point 202.

Each positioner may include a scale around its outer periphery or along its top surface that corresponds to the exact center of the cleat connector 150 relative to the reference point 202. Accordingly, the first positioner 160 may have a rotational scale that indicates the precise number of degrees that the cleat connector 150 is rotated relative to the reference point 202. For positioners that measure only translation, the scale may indicate the number of millimeters along a particular linear axis (e.g., X-axis or Y-axis) that the cleat connector is moved relative to the reference point. By consulting the scales on each positioner, the user can determine the X-axis translation, Y-axis translation, and Z-axis rotation of the cleat connector 150 and connected cleat 190 relative to the reference point. In some configurations, the scale on each positioner is digital and the movement of each positioner is displayed on a display that is integral with or connected to the cleat positioning device 100. The positioners may also be operatively connected to electric or mechanical actuators or motors that are configured to move the positioners with respect to the X-, Y-, and Z-axes according to the position input by a user using a user interface of the display.

Each of the three positioners 160, 170, 180 may be separately locked from movement and unlocked to allow movement. For example, a set screw on the first positioner top 161 may be tightened using an allen key, thereby selectively locking the first positioner 160 from rotating about the Z-axis in use. In such a configuration, the second and third positioners 170, 180 would still be free to move along their respective axes in use unless restrained like the first positioner 160. The ability to separately and selectively lock the positioners yields increased precision when placing using the cleat positioning device 100 to place a cleat 190 on the shoe base 200. For example, once the first positioner 160 was rotated to the optimal Z-axis rotation position relative to the reference point 202, the first positioner 160 could be locked to prevent the cleat connector 150, and attached cleat 190, from further rotation. The second positioner 170 could then be adjusted to the optimal Y-axis position and locked before finally adjusting the third positioner 180 to the optimal X-axis position and locking that positioner 180 in place. Locking the positioners in their optimal positions allows the overall proper cleat position to be locked in place while a new cleat 190 is secured to the shoe base 200. This lockable positioner configuration ensures that the cleat 190 does not move or become misaligned during the cleat installation procedure.

As described above, the shoe base 200 may be used with the cleat positioning device 10 to measure the position of an existing cleat 190 mounted to the shoe base. This technique will now be described with reference to FIG. 1. To measure the position of an existing cleat 190 on a shoe base 200, the appropriate cleat connector 150 (e.g., the cleat connector 150 that can accommodate and couple with the existing cleat 190) is provided and secured to the cleat positioning device 100. The positioners are adjusted to their respective zero positions (e.g., zero X- and Y-axis translation and zero Z-axis rotation of the cleat connector 150 and cleat 190 relative to the reference point 202) and locked in place. The cleat 190 is then coupled with the cleat connector 150. Once the cleat 190 is secured to the cleat connector 150, the positioners are unlocked. The shoe base 200 is then translated along the X- and Y-axes and rotated about the Z-axis as is necessary until the user is able to connect the coupler 211 of the shoe base 200 to the coupling portion 110 of the cleat positioning device. The positioners may then be secured in place. In use, the movement and rotation of the shoe base 200 that was required to allow the coupler 211 to secure to the coupling portion 110 is relayed from the cleat connector 150 to the positioners by the connecting member 153. The positioners 160, 170, 180 of the positioner assembly 155 measure the movement of the shoe base 200 that was required to allow the coupler 211 and coupling portion 110 to connect. Accordingly, once the coupler 211 and coupling portion 110 are secured together, the values on the positioner scales represent the center position of the existing cleat 190 relative to the reference point 202.

As is also described above, the cleat positioning device 100 may be used with a shoe base 200 to place a new cleat 190 at the optimal, desired position along the shoe base 200. This technique will now be described with reference to FIG. 1. To place a new cleat 190 at the proper position on the shoe base, the optimal cleat position is first determined. As described below, the optimal cleat position may be determined using the technology measuring pedal 300. After being provided the optimal cleat position, the appropriate cleat connector 150 (e.g., the cleat connector 150 that can accommodate and couple with the new cleat 190) is provided and secured to the cleat positioning device 100. The coupler 211 of the shoe base 200 is then secured to the coupling portion 110 of the cleat positioning device 100. The secure connection between the coupler 211 and coupling portion 110 results in the toe portion 230 of the shoe base resting on the working surface 151 of the cleat connector 150. Using the previously provided optimal cleat position, the positioners 160, 170, 180 of the positioner assembly 155 are adjusted to the optimal X-axis translation, Y-axis translation, and Z-axis rotation values, each of which are relative to the reference point 202 defined at the connection of the coupler 211 and coupling portion 110. Each positioner is locked after the positioner has been moved to its optimal position. Once the positioners are adjusted and locked, the cleat 190 coupled with the cleat connector 150 is in the optimal position along the shoe base 200, relative to the reference point 202. In this configuration, the cleat 190 is adjacent the shoe base 200 and already in the proper position, and simply must be secured to the shoe base 200. Accordingly, the new cleat 190 may then be secured to the shoe base 200 through one or more access openings 154 that extend from the positioner side 152 to the working surface 151 of the cleat connector 150.

Technology Measuring Pedal

With reference now to FIG. 5, the bicycle shoe base and cleat positioning system 10 may also comprise a technology measuring pedal 300. As mentioned above, the technology measuring pedal 300 may be used with the bicycle shoe base and cleat positioning system 10 to determine the optimal cleat position relative to the reference point 202. The technology measuring pedal 300 is a bicycle pedal comprising a pedal housing 330. The pedal housing 330 includes a spindle 331 for operatively attaching the technology measuring pedal 300 to a bicycle crank arm 301, thereby allowing the pedal 300 to transmit power to the bicycle drivetrain.

The shoe base 200 may removably couple with the top surface of the pedal housing 330 via the cleat 190. The cleat connecting portion of the pedal housing 330 include a recessed area that is configured to removably couple with a given style of cleat 190. The cleat connecting portion of the technology measuring pedal 300 may be interchangeable so as to accommodate and secure to all types and styles of cleats 190.

Enclosed within the pedal housing is an electronics array 330 that may include one or more pressure sensors, position sensors and GPS sensors, in addition to a measurement storage device and wireless communications hardware. When using the technology measuring pedal 300, pressure from the rider's foot is distributed throughout the toe portion 230 of the shoe base 200 to the cleat 190 and ultimately, the pedal 300. The pressure sensors within the electronics array are configured to measure the pressure distribution imparted on the pedal by the cleat 190. The location sensors measure the location and cadence of the pedal 300 as it cycles around the crank of the bicycle. Accordingly, the combination of the pressure and location sensors measure the pressure distribution placed upon the cleat 190 throughout all stages of pedal the bicycle. From these pressure and location measurements, the optimal cleat position may be calculated and determined relative to the reference point 202 on the coupler 211 of the shoe base 200 being using with the technology measuring pedal 300. For example, the electronics array 330 can determine the area of maximum pressure imparted by the shoe base 200 to the cleat 190. The coordinates of the maximum pressure area can be calculated by the technology measuring pedal, and those coordinates can then be used to either adjust the position of an existing cleat 190 to the optimal position or place a new cleat 190 at the optimal position along the shoe base 200.

The measurements obtained by the pressure and location sensors may be stored to a storage device such as a flash storage drive, a solid state hard drive or MicroSD device, or the like. The pressure and location sensor measurements may also be transmitted via RFID, Bluetooth, or other suitable wireless transmission hardware that is located within the electronics array 330 of the technology measuring pedal 300. The measurements may be transmitted to a companion mobile application running within the operating environment of a mobile device. In some configurations, the measurements from the sensors of the electronics array 330 may be uploaded to a remote server location and made available for retrieval by the user via a mobile or desktop website or application.

In use, the measurements from the sensors in the electronics array 330 may also be transmitted wirelessly or via a hardware connection from the technology measuring pedal 300 to a data processing and storage unit 295 of the connected shoe base 200. For example, connection of the shoe base 200 with the technology measuring pedal 300 may involve a USB connection. In some embodiments, when in use, measurements from the technology measuring pedal 300 are communicated to the shoe base 200 which stores the results and optimal cleat position on a hard drive such as a flash drive or MicroSD card.

After using the shoe base 200 with the technology measuring pedal to determine the optimal cleat position, the shoe base 200 can be used with the cleat positioning device 100 to achieve the optimal cleat position. In some embodiments, the cleat positioning device 100 communicates with (e.g. reads data from) the shoe base 200 to obtain the optimal cleat position which has been stored in the shoe base 200 by the technology measuring pedal 300. In such embodiments, the cleat positioning device 100 may be configured with electronic actuators or motors that adjust the positioners according to the optimal cleat position information to adjust a new cleat to the optimal position along the shoe base 200, relative to the reference point 202. Accordingly, the technology measuring pedal 300 may be used to determine the optimal cleat position relative to the reference point of the shoe base 200, and the cleat positioning device enables the accurate and precise positioning or placement of the cleat 190 in the optimal position along the shoe base 200.

While certain embodiments of the inventions have been described, these embodiments have been presented by way of example only, and are not intended to limit the scope of the disclosure. Indeed, the novel methods and systems described herein may be embodied in a variety of other forms. Furthermore, various omissions, substitutions and changes in the systems and methods described herein may be made without departing from the spirit of the disclosure. The accompanying claims and their equivalents are intended to cover such forms or modifications as would fall within the scope and spirit of the disclosure. Accordingly, the scope of the present inventions is defined only by reference to the appended claims.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, or 0.1 degree.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

Of course, the foregoing description is that of certain features, aspects and advantages of the present invention, to which various changes and modifications can be made without departing from the spirit and scope of the present invention. Moreover, the devices described herein need not feature all of the objects, advantages, features and aspects discussed above. Thus, for example, those of skill in the art will recognize that the invention can be embodied or carried out in a manner that achieves or optimizes one advantage or a group of advantages as taught herein without necessarily achieving other objects or advantages as may be taught or suggested herein. In addition, while a number of variations of the invention have been shown and described in detail, other modifications and methods of use, which are within the scope of this invention, will be readily apparent to those of skill in the art based upon this disclosure. It is contemplated that various combinations or subcombinations of these specific features and aspects of embodiments may be made and still fall within the scope of the invention. Accordingly, it should be understood that various features and aspects of the disclosed embodiments can be combined with or substituted for one another in order to form varying modes of the discussed devices.

What is claimed is:

1. A bicycle shoe cleat positioning device for use in determining a position of a bicycle shoe cleat, the bicycle shoe cleat positioning device comprising:
    a base portion having a top base surface;
    a holding portion having a top part and a bottom part, the top part being configured to engage a coupler of a bicycle shoe and the bottom part being fixedly connected to the base portion;
    a cleat connector having a top side and a bottom side, the top side configured to accommodate and secure to the bicycle shoe cleat, the bottom side connected to a connecting member; and
    a cleat positioning assembly for determining the position of the bicycle shoe cleat, the cleat positioning assembly comprising:
        a first positioner configured to determine a first position of the cleat connector about a first axis, wherein the first positioner has a first top portion and a first bottom portion, and the first top portion is connected to the connecting member, wherein the first axis is a rotational axis;
        a second positioner configured to determine a second position of the cleat connector along a second axis, wherein the second positioner has a second top portion and a second bottom portion, and the second top portion is directly connected with the first positioner such that the first positioner controls movement of the cleat positioning assembly relative only to the first axis; and
        a third positioner configured to determine a third position of the cleat connector along a third axis, wherein the third positioner has a third top portion and a third bottom portion, the third top portion being directly connected with the second positioner such that the second positioner controls movement of the cleat positioning assembly relative only to the second axis, and the third bottom portion being directly connected with the top base surface such that the third positioner controls movement of the cleat positioning assembly relative only to the third axis;
        wherein the first, second and third positions of the cleat connector define a set of coordinates, and wherein the set of coordinates reflects the position of the bicycle shoe cleat relative to a reference point on a heel portion of the bicycle shoe when the bicycle shoe is secured to the bicycle shoe cleat positioning device; and
        wherein the first, second, and third axes are perpendicular to one another.

2. The bicycle shoe cleat positioning device of claim 1, wherein the first, second, and third positioners are selectively and separately securable to prevent and permit movement of the first, second, and third positioners relative to the first, second, and third axes respectively.

3. The bicycle shoe cleat positioning device of claim 1, wherein the second axis is a linear axis such that the second position is a linear position defined along the second axis.

4. The bicycle shoe cleat positioning device of claim 1, wherein the third axis is a linear axis such that the third position is a linear position defined along the third axis.

5. The bicycle shoe cleat positioning device of claim 1, the first positioner further comprising a first scale along an outer periphery which identifies the first position of the cleat connector.

6. The bicycle shoe cleat positioning device of claim 1, the second positioner further comprising a second scale along an outer periphery which identifies the second position of the cleat connector.

7. The bicycle shoe cleat positioning device of claim 1, the third positioner further comprising a third scale along an outer periphery which identifies the third position of the cleat connector.

8. The bicycle shoe cleat positioning device of claim 1, the first positioner further comprising a first annular shape, the second positioner further comprising a second annular shape, and the third positioner further comprising a third annular shape.

9. The bicycle shoe cleat positioning device of claim 1, wherein the holding portion is configured to engage the coupler with a snap-fit.

10. A cleat positioning system, the cleat positioning system comprising:
a cleat positioning device, the cleat positioning device comprising:
a base portion having a top base surface;
a holding portion secured to the base portion, the holding portion configured to secure to a coupler of a bicycle shoe;
a cleat connector having a working side and a positioner side, the working side being configured to accommodate and couple with a cleat, and the positioner side being operatively connected to a connecting member; and
a cleat positioning assembly for determining a position of the cleat, the cleat positioning assembly comprising:
a first positioner configured to determine a first position of the cleat connector about a first axis, wherein the first positioner has a first top portion and a first bottom portion, and the first top portion is connected to the connecting member, wherein the first axis is a rotational axis;
a second positioner configured to determine a second position of the cleat connector along a second axis, wherein the second positioner has a second top portion and a second bottom portion, and the second top portion is directly connected with the first positioner such that the first positioner controls movement of the cleat positioning assembly relative only to the first axis; and
a third positioner configured to determine a third position of the cleat connector along a third axis, wherein the third positioner has a third top portion and a third bottom portion, the third top portion being directly connected with the second positioner such that the second positioner controls movement of the cleat positioning assembly relative only to the second axis, and the third bottom portion being directly connected with the top base surface such that the third positioner controls movement of the cleat positioning assembly relative only to the third axis;
wherein the first, second, and third axes are perpendicular to one another.

11. The cleat positioning system of claim 10, wherein the first, second, and third positioners are selectively securable to thereby selectively prevent and permit movement of the first, second, and third positioners along the first, second, and third axes respectively.

12. The cleat positioning system of claim 10, the cleat positioning device further comprising a storage medium configured to store cleat position information communicated by a technology measuring pedal.

13. The cleat positioning system of claim 10, the cleat positioning device being configured to receive a desired cleat position, the cleat positioning device further comprising one or more electronic actuators configured to automatically adjust the first positioner, the second positioner, and the third positioner to the desired cleat position.

14. The cleat positioning system of claim 10, the cleat positioning device further comprising at least one electronic actuator and a user input device, the at least one electronic actuator being configured to adjust the first positioner, the second positioner, and the third positioner to a cleat position that is selected with the user input device.

15. The cleat positioning system of claim 10, wherein at least one of the second axis and the third axis is a linear axis.

16. A bicycle shoe cleat positioning system for use in measuring and adjusting a position of a bicycle shoe cleat, the bicycle shoe cleat positioning system comprising:
a holding portion having a top part and a bottom part, the top part being configured to engage a coupler of a bicycle shoe and the bottom part being fixedly connected to a base portion;
a cleat connector having a top side and a bottom side, the top side configured to accommodate and secure to the bicycle shoe cleat, the bottom side connected to a connecting member; and
a cleat positioning assembly for determining the position of the bicycle shoe cleat, the cleat positioning assembly comprising:
a first positioner configured to determine a first position of the cleat connector about a first axis, wherein the first positioner has a first top portion and a first bottom portion, and the first top portion is connected to the connecting member, wherein the first axis is a rotational axis;
a second positioner configured to determine a second position of the cleat connector along a second axis, wherein the second positioner has a second top portion and a second bottom portion, and the second top portion is directly connected with the first positioner such that the first positioner controls movement of the cleat positioning assembly relative only to the first axis; and
a third positioner configured to determine a third position of the cleat connector along a third axis, wherein the third positioner has a third top portion and a third bottom portion, the third top portion being directly connected with the second positioner such that the second positioner controls movement of the cleat positioning assembly relative only to the second axis, and the third bottom portion being directly connected with a top base surface such that the third positioner controls movement of the cleat positioning assembly relative only to the third axis;
wherein the first, second, and third axes are perpendicular to one another.

17. The bicycle shoe cleat positioning system of claim 16, wherein the first, second and third positions of the cleat connector define a set of coordinates that reflect the position of the bicycle shoe cleat relative to a reference point on a heel portion of the bicycle shoe when the bicycle shoe is secured to the cleat connector and the holding portion.

18. The bicycle shoe cleat positioning system of claim 16, wherein the holding portion is configured to engage the coupler with a snap-fit.

19. The bicycle shoe cleat positioning system of claim 16, wherein the second axis is a linear axis such that the second position is a linear position defined along the second axis.

20. The bicycle shoe cleat positioning system of claim 16, wherein the third axis is a linear axis such that the third position is a linear position defined along the third axis.

* * * * *